Feb. 16, 1932.   C. G. WILLIAMSON   1,845,859
TOWING DEVICE
Filed May 7, 1930
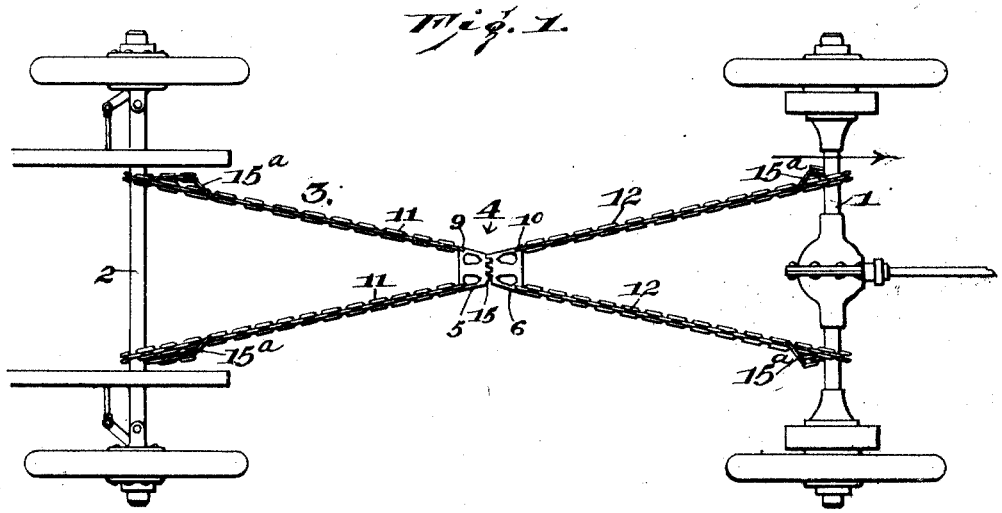
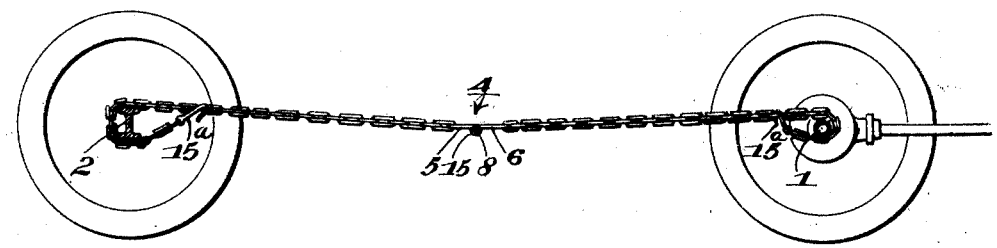
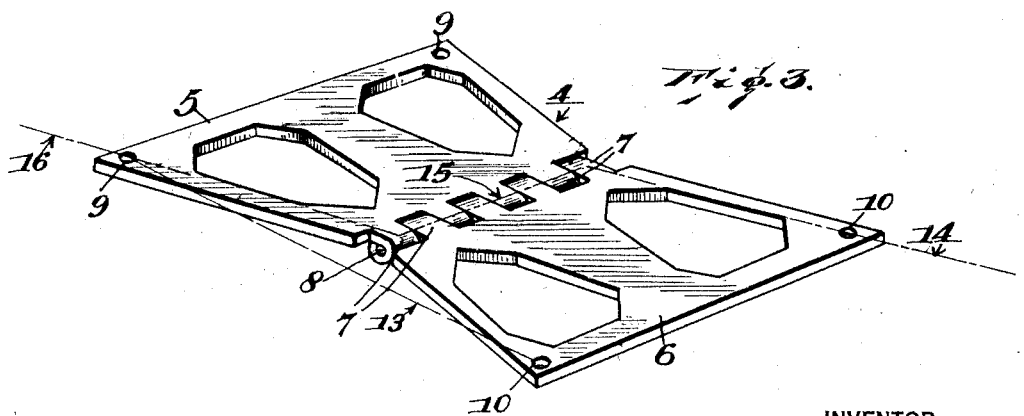
WITNESSES
INVENTOR
C. G. Williamson,
BY
ATTORNEY Patented Feb. 16, 1932

1,845,859

UNITED STATES PATENT OFFICE

CLAUDE G. WILLIAMSON, OF BLUEFIELD, WEST VIRGINIA

TOWING DEVICE

Application filed May 7, 1930. Serial No. 450,562.

This invention relates to improvements in towing devices and it consists of the constructions, combinations and arrangements herein described and claimed.

An object of the invention is to provide a connector or coupling for a plurality of diverging tow elements which occupies a medial position relative to said elements in order to equalize the pulling strain on each vehicle.

Another object of the invention is to provide a towing device which is largely made up of parts that can be bought on the open market, the only specially manufactured portion being the coupling between the flexible connecting elements, and said coupling being of such a nature that it will readily lend itself for stamping, for instance, and thereby to rapid manufacture.

A further object of the invention is to provide a towing device having a coupling to which pairs of towing elements are connected at separated points and connectible to the towing and disabled vehicles at separated points to establish a substantially crossed relationship and to apply the pull diagonally.

Other objects and advantages will appear in the following specification, reference being had to the accompanying drawings in which Figure 1 is a plan view illustrating the manner of connecting the towing device to a towing and disabled vehicle respectively.

Figure 2 is a side elevation of the device, the axles of the vehicles being shown in section.

Figure 3 is a perspective view of the connector or coupling.

In the drawing the rear axle of the towing vehicle is denoted 1 while the front axle of the towed or disabled vehicle is denoted 2. The towing device is generally designated 3. This towing device comprises a coupling 4 consisting of a pair of plates 5, 6, each formed with matching hinge knuckles 7 which are connected by a pin 8. The hinge enables folding the coupling 4 as when the device is not in use.

The plates 5, 6 are of diverging form thus to enable locating the holes 9, 10 or other so-called inner connecting points of pairs 11, 12 of towing elements at the approximately remote corners of the plates at places beyond the axial extremities of the hinge pin 8. In other words, a line 13 (Fig. 3) drawn between the holes 9, 10 would fall beyond the adjacent end of the hinge pin 8.

The purpose of this arrangement is to cause the embracing of practically all of the hinge pin 8 in the line of pull. For example, the pull of the upper element 12 (Fig. 1) would occur on the line 14 (Fig. 3), extend along the line 15 of the axis of the hinge pin 8 and be delivered along the line 16 to the lower element 11 (Fig. 1). The delivery of the pull of the lower element 12 (Fig. 1) to the upper element 11 would be similarly traced, and the point of transfer of the pull would coincide with the line 15.

It is thus apparent that substantially the entire hinge pin 8 is put under active stress by virtue of the pull, and it is this fact as well as the diverging arrangement of the pairs of towing elements 11, 12 that converts the otherwise perfectly flexible inert towing device 3 into a rigid connnector between the axles 1 and 2 when the towing vehicle is in motion in the direction of the arrow. If the connecting points 9, 10 were placed closer toward the longitudinal center of the coupling 4 the axial pull line 15 would be considerable shorter since the lines of pull 14, 16 would meet sooner.

It is to be observed that the angles of the side edges of the plates 5, 6 substantially agree with the angles of the diverging elements 11, 12 when the latter are applied to the respective axles. The pull of one of the elements (for example the upper one in Fig. 1) is thus transferred to its complementary element 11 (the lower one in Fig. 1) in the same direction. The pulls are crossed but by virtue of the fact that the coupling 4 occupies a medial position respecting the pairs of elements 11, 12 it follows that these pulls are equalized perfectly respecting the two axles, it being necessary, however, when using a towing device of this type to have a person in the towed vehicle to attend the brake in stopping.

For the purpose of connecting the elements 11, 12 to the respective axles the elements are equipped with hooks 15ª at the extremities which are adapted to be inserted in any convenient link after the elements have been appropriately applied to the axles. These hooks also enable adjusting the length of the towing elements as regards the distance between the coupling 4 and the axles 1, 2, a reasonable uniformity of length being desirable in order that the foregoing steering of the disabled vehicle may be assisted.

It is apparent that the pull of the towing vehicle is transferred directly to the disabled vehicle along lines (for example 14, 15 and 16 Fig. 3) as nearly direct as desirable. The pull applied to the upper element 12 at its connecting point at the axle 1 is transferred to a diagonally opposite point at the axle 2 through the medially located coupling 4.

The elements 11, 12 are shown as chains, but they may comprise cables or the equivalents. By folding the coupling 4 along the hinges 7, 8 and wrapping the elements 11, 12 around the folded coupling it becomes possible to store the device in a very small space.

Another use of the invention is as a thief-proof device when parking the automobile. One of the chains can be run through a front wheel, wrapped around the axle and locked, whereupon the automobile cannot ordinarily be moved.

While the construction and arrangement of the improved towing device is that of a generally preferred form, obviously modifications and changes may be made without departing from the spirit of the invention or the scope of the claims.

I claim:

1. A towing device comprising a pair of plates, each with matching hinge knuckles and adjacent side edges diverging from said knuckles, a removable pin connecting the knuckles, and flexible towing elements connected with the approximate remote corners of the plates at places situated beyond the extremities of the hinge pin.

2. A towing device comprising a pair of plates having matching hinge knuckles to be fitted together, a pin insertible in the knuckles to hold the plates together for hinge motions, the remote corners of said plates having holes, flexible elements secured to the plates in each one of the holes, said elements constituting pairs of connectors which are extensible toward the rear and front axles of towing and towed vehicles respectively, and means on the extremities of said elements to be applied directly to the elements after said elements are looped around the axles, thereby to constitute a temporary fastening.

3. A towing device comprising a pair of plates having matching hinge knuckles to be fitted together, a pin insertible in the knuckles to hold the plates together for hinge motions, the remote corners of said plates having holes, chains secured to the plates in each one of the holes said chains constituting pairs of connectors which are extensible toward the rear and front axle of towing and towed vehicles, and hooks on the extremities of the chains to be caught in the links of the chains after said chains are looped around the axle thereby to constitute a temporary fastening.

CLAUDE G. WILLIAMSON.